(12) United States Patent
Trowbridge et al.

(10) Patent No.: US 8,876,571 B2
(45) Date of Patent: Nov. 4, 2014

(54) AERIAL DISPLAY SYSTEM WITH MARIONETTES ARTICULATED AND SUPPORTED BY AIRBORNE DEVICES

(71) Applicant: Disney Enterprises, Inc., Burbank, CA (US)

(72) Inventors: Robert Scott Trowbridge, La Canada, CA (US); James Alexander Stark, South Pasadena, CA (US); Clifford Wong, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 163 days.

(21) Appl. No.: 13/768,905

(22) Filed: Feb. 15, 2013

(65) Prior Publication Data
US 2014/0231590 A1     Aug. 21, 2014

(51) Int. Cl.
*A63J 19/00*         (2006.01)
*A63H 27/00*         (2006.01)
*B64C 39/02*         (2006.01)

(52) U.S. Cl.
CPC ............... *A63J 19/00* (2013.01); *A63H 27/12* (2013.01); *B64C 39/024* (2013.01); *B64C 2201/12* (2013.01)
USPC ............ 446/84; 446/83; 446/454; 446/456; 446/491

(58) Field of Classification Search
CPC ....... A63J 19/00; A63J 19/06; A63J 2019/003
See application file for complete search history.

(56) References Cited

U.S. PATENT DOCUMENTS

| | | | |
|---|---|---|---|
| 3,024,551 A * | 3/1962 | Oppenheim | 40/418 |
| 4,037,358 A * | 7/1977 | Rosenbaum | 446/30 |
| 5,102,126 A * | 4/1992 | Nguyen | 273/454 |
| 6,827,626 B1 * | 12/2004 | Feeney et al. | 446/359 |
| 2006/0155508 A1 * | 7/2006 | Choi | 702/150 |
| 2010/0227527 A1 * | 9/2010 | Smoot et al. | 446/362 |
| 2013/0130586 A1 * | 5/2013 | Orestes | 446/33 |

* cited by examiner

*Primary Examiner* — Dmitry Suhol
*Assistant Examiner* — Alex F. R. P. Rada, II
(74) *Attorney, Agent, or Firm* — Marsh Fischmann & Breyfogle LLP; Kent A. Lembke

(57) ABSTRACT

A system for performing an aerial display. The system includes a plurality of unmanned aerial vehicles (UAVs) and a ground control system with a processor executing a fleet manager module and with memory storing a different flight plan for each of the UAVs. The system further includes a marionette with a body and articulatable appendages attached to the body. The body and appendages are supported with tether lines extending between the marionette and the UAVs. Then, during a display time period, the UAVs concurrently execute the flight plans to position and articulate the marionette within a display air space. In some embodiments, the UAVs each is a multicopter, and each of the multicopters includes a local controller operating to move the multicopter through a series of way points defined by the flight plan associated with the multicopter.

20 Claims, 7 Drawing Sheets

AERIAL DISPLAY SYSTEM WITH MARIONETTES ARTICULATED AND SUPPORTED BY AIRBORNE DEVICES

BACKGROUND

1. Field of the Description

The present invention relates, in general, to aerial displays and control of unmanned aerial vehicles (UAVs) such as multicopters, and, more particularly, to an aerial display system (and corresponding control method(s)) providing aerial marionettes or puppets articulated and supported by UAVs.

2. Relevant Background

In the entertainment industry, there are many applications where it is desirable to provide an aerial display. For example, an amusement park may have a lagoon or other open space over which it is desired to present a display to entertain visitors. In another example, massively large aerial displays may be presented at sport stadiums or other venues to celebrate holidays such as New Year's Day throughout the world and the $4^{th}$ of July in the United States.

While it is desirable to provide exciting and surprising shows, each large aerial display must also be presented in a safe manner. Further, for theme parks and other settings, it may be useful for the aerial display to be controlled and choreographed to be repeatable but adapted to be modified. For example, it may be useful to repeat a particular show for several weeks (e.g., during a particular holiday season) but then modify it to suit a new season or provide a differently themed show to attract repeat visitors.

Presently, aerial displays have been limited in how easy it has been to alter the choreography and to provide a repeatable show. Some "aerial" displays have relied upon very complex fountain systems to provide sprays of water upon which light may be projected or directed. These shows can be difficult to change or modify to provide a new show and are limited in the amount of the air space that can be utilized as the spraying water only reaches certain heights. Other aerial shows rely on fireworks, which can be dangerous to implement and often provide a different show result with each use. Other displays may us aircraft such as blimps dragging banners or even large display screens. While useful in some settings, these aircraft-based displays typically have been limited in size and use only a small number of aircraft and display devices.

SUMMARY

The inventors recognized that presently there are no mechanisms for creating very large aerial displays such as a display that is reusable/repeatable, dynamic, and interactive. To address this need, the following description teaches an aerial display system (and control method) that one or more large (e.g., blimp-sized) marionettes or string puppets, numerous unmanned aerial vehicles (UAVs) tethered to the marionettes via control/support lines (e.g., the marionette strings) linked to joints and/or the frames of the marionettes, and a ground control station for choreographing the movement of the UAVs to control movement of the marionettes (e.g., to provide puppetry or controlled movement of the marionettes/puppets) to provide a dynamic aerial display. While the aerial display system is described generally as providing marionette structures that are suspended, the term "marionette" may also be used to cover structures supported by the UAVs above the UAVs (i.e., not suspended).

The aerial displays described herein were designed and created because it was understood by the inventors that many characters fly in their stories (such as in a book or movie) but, prior to the inventors' aerial displays, it was typically not technically feasible to create a flying object that mimics the characters such as due to size, weight, dimensions, or other design challenges. The aerial displays allow a show designer to utilize a flying character in numerous environments. For example, the aerial display system may include a marionette that mimics a character but that is much larger than "true size" in order that the flying marionette can be seen by a large number of spectators. The aerial display systems also allow the UAVs to be selectively controlled, such as to follow a flight plan providing flock-type control over the UAVs, to provide articulation of the large, flying marionette. This is a significant improvement over prior flying characters, which typically were provided in the form of parade or other blimps/balloons filled with hot air or other gases and that had little and/or awkward articulation of any movable parts.

More particularly, a system is provided for performing an aerial display in a predefined display air space. The system includes a plurality of unmanned aerial vehicles (UAVs) and a ground control system with a processor executing a fleet manager module and with memory storing a different flight plan for each of the UAVs. The system further includes a marionette with a body and articulatable appendages attached to the body. The body and appendages are supported with tether lines extending between the marionette and the UAVS. Then, during a display time period, the UAVs concurrently execute the flight plans to position and articulate the marionette within a display air space. In some embodiments, the UAVs each is a multicopter, and each of the multicopters includes a local controller operating to move the multicopter through a series of way points defined by the flight plan associated with the multicopter.

In some applications, the marionette includes a plurality of connecting elements each attached to an end of one of the tether lines. In other cases, though, marionettes are supported above the UAVs or multicopters such as with hard rods (e.g., tether lines may be construed broadly to encompass strings or wires for below UAV support and stiffer rod or support elements used to hold a marionette or articulable object for connection point) located above the UAV or multicopter. Each of the UAVs may be attached via one of the tether lines to only one of the connecting elements. In other cases, though, each of the UAVs is attached via the tether lines to two or more of the connecting elements. In such cases, each of the UAVs may include a winch assembly for selectively adjusting a length of each of the tether lines to articulate the marionette during the display time period. In other embodiments, at least sonic of the connecting elements are coupled to an articulating frame on or within the body or the appendages of the marionette.

According to another aspect, the display system may include a second marionette supported by one or more of the UAVs. In such a display system, the flight plans may be configured to define flight paths causing the marionettes to be positioned in proximity in the display air space to form a floating superstructure. This superstructure may be assembled and disassembled to create a larger marionette that is articulated by movement of the UAVs and/or later disassembled to create a dynamic aerial display.

DETAILED DESCRIPTION

Figure 1:
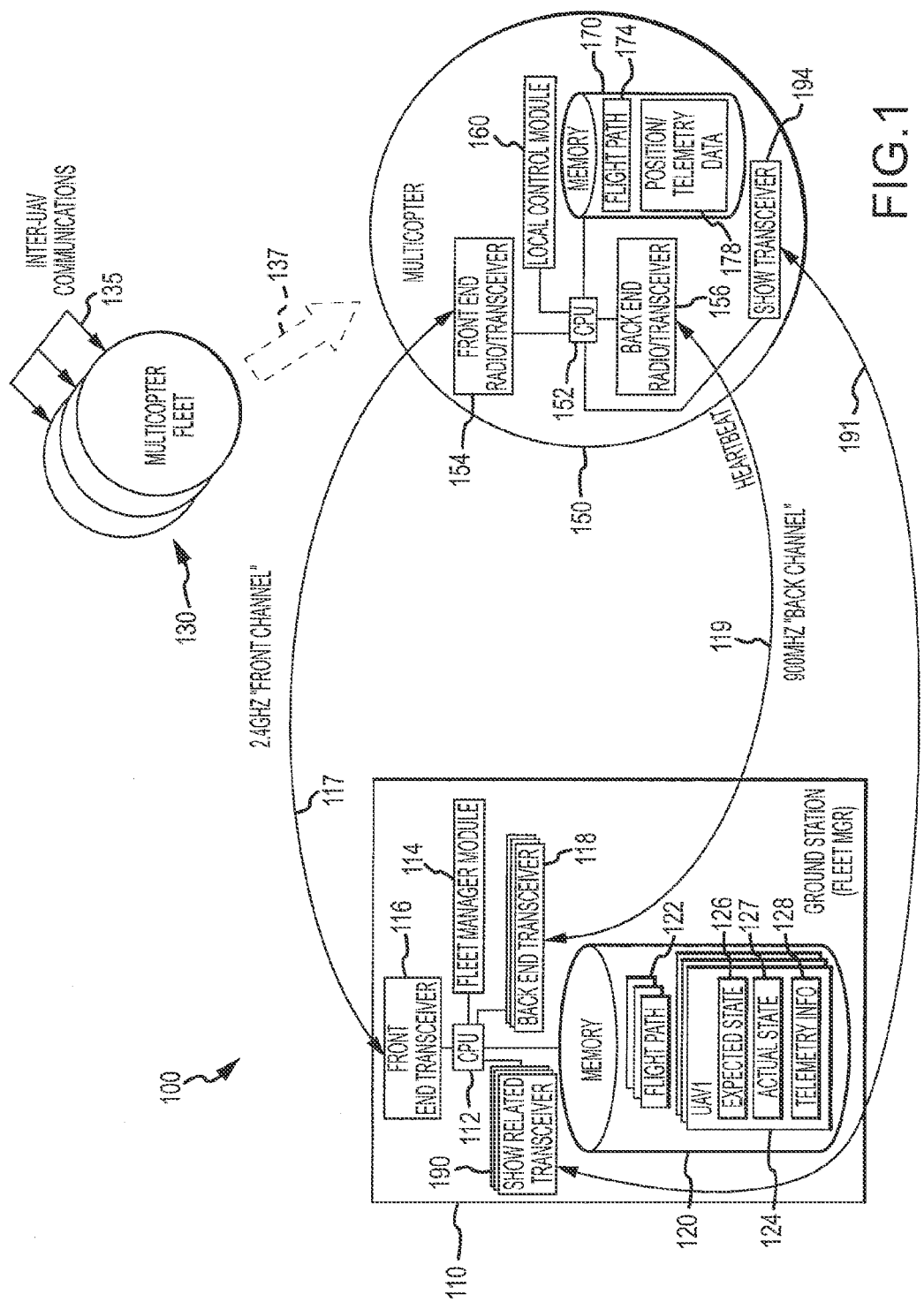
FIG. 1 is functional block diagram of a multiple UAV system useful for implementing the flight control techniques described herein.

Briefly, aerial display systems (and corresponding control methods or operating techniques) are described that present large aerial marionettes. The support wires, lines, or rods for a marionette are tethered to one or more airborne vehicles. In a manner similar to hands holding a control frame of a string puppet, the airborne vehicles are moved, through a flight plan (or follow a flight path made up of a number of way points) to support and position the tether/connection points of the marionette to articulate or animate the character mimicked by the marionette.

The character's body (torso, head, and movable appendages/limbs) may be fabricated to be very light in weight with little or no structural frame other than the joints and frame portion used to allow support and articulation by the airborne vehicles. The body may mainly be formed from mesh or fabric sheets that are relatively easily permeable by wind. Alternatively, the body may be formed with a balloon or blimp-type sheet(s) that may be chosen to at least partially contain a gas such as helium to lighten the body or portions of the body of the marionette. In other words, these structures are formed with two subcomponents: a propulsion system (e.g., multiple UAVs) and a payload (e.g., a character), and these two subcomponents interact with tightly coupled control laws.

The suspension assembly for each marionette may be in the form of one wire or line per support vehicle used to support the marionette. In other cases, though, each airborne vehicle may be tethered via two, three, or more lines to the marionette (e.g., to each of a marionettes fingers, to multiple points of a head, arm, or leg, or the like). These control/support lines may be on a frame underneath the vehicle to allow the relative lengths of the lines to be modified during operations or a winch or similar mechanism may be provided to selectively alter the relative lengths of the control lines. The relative and changeable lengths of the limes from a single airborne vehicle allow the single vehicle to better articulate the portion of the marionette that it supports in the display air space.

In some cases, each support wire/line is fabricated to include at least one break point that is weaker than the rest of the line such that a break in the line occurs in a planned way, e.g., when the vehicles fly too far from each other generating too much tension in the marionette body or its internal framework/tethering points. Precise positioning of the airborne vehicles, such as through differential GPS, inertial navigation, compass information, and onboard and/or offboard vision-based localization, may be used to execute the choreography (e.g., based on the vehicle-specific flight plans) of the marionette (and the character that it is intended to mimic). Further, the precise positioning is used to maintain a consistent pattern in some operating modes, even if failure of a multicopter or other UAV occurs as the system may be configured to adapt to the present number of valid UAVs in flight.

The flying objects or airborne vehicles may take many forms to selectively move a marionette within a display air space. However, in some embodiments, the flying object is a UAV, which may be a multicopter. In such aerial display systems, a multicopter is modified or used to carry a marionette via one or more control wires/lines. Further, the display system may be controlled so that each multicopter is aware of other multicopters in their vicinity and is also able to be controlled by flocking logic via a ground station. In this manner, the set of all multicopters may be considered a puppeteer for the supported marionette or string puppet. Significantly, each multicopter may be aware of other multicopters in the vicinity, and all are controlled by a centralized show controller (e.g., a fleet control module or show program running/executed on a ground control system (GCS) or ground station).

Since a plurality of multicopters may be used to implement an aerial display system, it may be useful to first discuss a control method and system (or multiple UAV systems incorporating such control methods/systems) for use in controlling a flock of UAVs numbering 2 to 10 or more UAVs (e.g., 10 to 100 or more multicopters). This discussion of a control method may then be followed by specifics on particular implementations of aerial display system that may or may not use multicopters and its control method for such a large number of UAVs to act as a puppeteer for a large aerial marionette.

Briefly, the control method uses hierarchical-based supervisory control with multicasting techniques along with adaptive logic including onboard or local control modules provided on each UAV to adjust flight paths to safely avoid collisions based on communications with nearby UAVs. The result of the described control of the multiple UAVs in an airspace such as over a theme park or stadium is a flocking behavior in which the UAVs appear to move in a synchronized manner with movements that are not completely independent nor completely centrally controlled. The control method may be implemented in a system with four general components or pieces: a fleet management station (or ground station); flying objects or UAVs; at least dual-path communications between the ground station and the UAVs (e.g., much of the description below highlights use of dual-channel communication but some embodiments may use three or more transceivers onboard a UAV (such as to provide a front channel (supervisory), a back channel (autonomous), and a show channel (lighting, payload actuators, and so on)); and stage/show management. These four components or aspects of the control method/system are described below with reference to the figures.

First, with regard to dual-path communications, FIG. 1 illustrates a system 100 that may be used to control flying objects in a safe and repeatable manner. The system 100 includes a ground station or fleet manager 110 along with a plurality of multicopters (or UAVs) 130, with each being implemented (as shown via arrow 137) with the configuration of multicopter 150. As shown, the fleet of multicopters 130 is configured for inter-UAV or multicopter communications 135, and, as explained below, this intercommunication allows the multicopters 130 to safely react to a determination that another multicopter 130 is in a close proximity to avoid collisions while generally remaining on a predefined flight path. During runtime, ground station/fleet manager 110 is used for sending commands to maintain show performance and quality and to monitor safety information. During non-runtime, it uploads the show requirements.

Dual-path communication between the ground station 110 and the multicopter 150 is provided by each flying object or multicopter 150 having two communication channels shown at 117 and 119 in FIG. 1. To this end, the ground station 110 includes a front-end radio or transceiver 116 and a back end radio or transceiver 118, and the multicopter 150 also has two radios 154 and 156 configured for communicating 117, 119 with the station radios 116, 118. Some embodiments may further include a show radio or transceiver 190 in the ground station 110 that communicates over show channel 191 with a radio/transceiver 194 on the multicopter 150. The first or front end channel 117 provides a high speed communications channel (e.g., 2.4 GHz or the like) that is useful to provide choreographed movement of the multicopters 150 (e.g., when the UAVs 130 are not simply following a flight path but have time-synchronized movements from position to position in an airspace).

For example, the front channel 117 may be thought of as a robust, low-bandwidth "primary" channel for synchronized motion control and manual override control by the ground station. The back channel 119 may be thought of as a "secondary" high-bandwidth channel. The back channel 119 may be used for transmitting telemetry from the multicopter 150 to the ground station 110, for the ground station 110 to transmit signals for supervisory control of the multicopter 150, and for a back up communication channel should the front end channel 117 fail to one or more of the multicopters 150. Further, the show channel 191 may be used for non-flight-related communications.

The ground station 110 is shown to include a processor(s) 112 that runs software to perform the ground station control functions discussed herein such as the fleet manager module 114. The processor 112 controls operations of the radios/transceivers 116, 118 including managing memory 120 to store data received from the multicopter 150 over channel 117, 119. The memory 120 is shown to store flight paths 122 that may be downloaded or provided over front end channel 117 to the multicopter 150 (of those in fleet 130) for use by a local control module 160 to control movement of the multicopter 150 (e.g., via selectively throttling of motors turning one or more of the rotors). The memory 120 also stores a set or file of data 124 for each multicopter 150 of a fleet 130, and the data 124 may include an expected state 126 for the multicopter 150, an actual state 127 of the multicopter 150, and other telemetry data 128 (which may be passed via the back end channel 119 to the ground station 110).

Each multicopter 150 is shown to include one or more processors 152 that control operation of the two radios 154, 156 so as to process received data/signals on channel 117, 119 and to, as appropriate, store data in onboard memory 170. The processor 152 also may run or execute code, programs, or software such as a local control module 160 to function to perform the UAV-control functions described herein. The memory 170 may be used to store a flight path 174 provided by the ground station 110 and to also store determined positions and telemetry data 178 (that may be provided to the ground station 119 as shown in memory 128). The telemetry data 178 may include a heartbeat (each UAV in fleet 130 indicates to the ground station that is operational or "alive"). The telemetry data 178 may further include a present position of the multicopter 150 (e.g., a three dimensional location in the airspace) and the present speed of the multicopter 150. Further, the telemetry data 178 may include the health of any monitored components on the multicopter 150 and a battery life/status as well as other monitored data.

The fleet management component or module 114 acts to monitor the expected state 126 and the actual state 127 each of the flying objects 150. For example, the module 114 may compare a present position or traveling speed of a multicopter 150 with its expected state 126 (which may be defined by a flight path 122 or a choreographed and time-synchronized movement of UAVs 130 such as in a light or other aerial display/show). Based on this monitoring, the fleet management module 114 may make adjustments such as using the following priorities: localization (e.g., position of the multicopter 150 with respect to other UAVs/multicopters); environment (e.g., to adjust for high wind conditions or the like); safety (e.g., return the multicopter 150 to a safe location or operating mode if it or other UAVs are not operating as expected); show performance (e.g., adjust position, speed, or other operating parameters to meet show needs); fleet status; and operator convenience/performance needs.

As discussed above, the fleet management module 114 and local control module 160 are configured to work together to provide flocking-type control. In use, the inter-UAV communications 135 are used to allow operational data to flow or spread hierarchically among the UAVs 130 rather than relying upon centralized/ground control alone. In other words, the fleet management module 114 provides a level of centralized control or central logic that acts to control the movement of the UAVs/multicopters 130 such as by providing flight paths 122 and/or making real time adjustments based on a comparison of expected state 126 and actual state 127 (or for safety reasons). With regard to inter-UAV communications, it may be useful to note the following: (a) some units may be designated as master nodes talking with the fleet manager; and (b) the master nodes may operate to send out in-flight calculated information or commands to remaining UAVs.

The movement/control is not swarm-based control in part because swarming UAVs can collide or have an inherent lack of safety and because the system 100 is designed to avoid random movements as want a flock or synchronized movements among the multicopters 130, 150. However, the inter-UAV communications 135 as processed and generated by the local control module allows each multicopter 150 to react safely to environment conditions such as increasing or direction-changing wind and presence/movement of neighboring multicopters 130, 150 as crossing flight paths is allowed in the system 100 (e.g., may be required by flight paths 122). In other words, the onboard logic 160 acts to control the multicopter 150 movements so as to avoid collisions while attempting to stay generally on the flight path 174.

Figure 2:
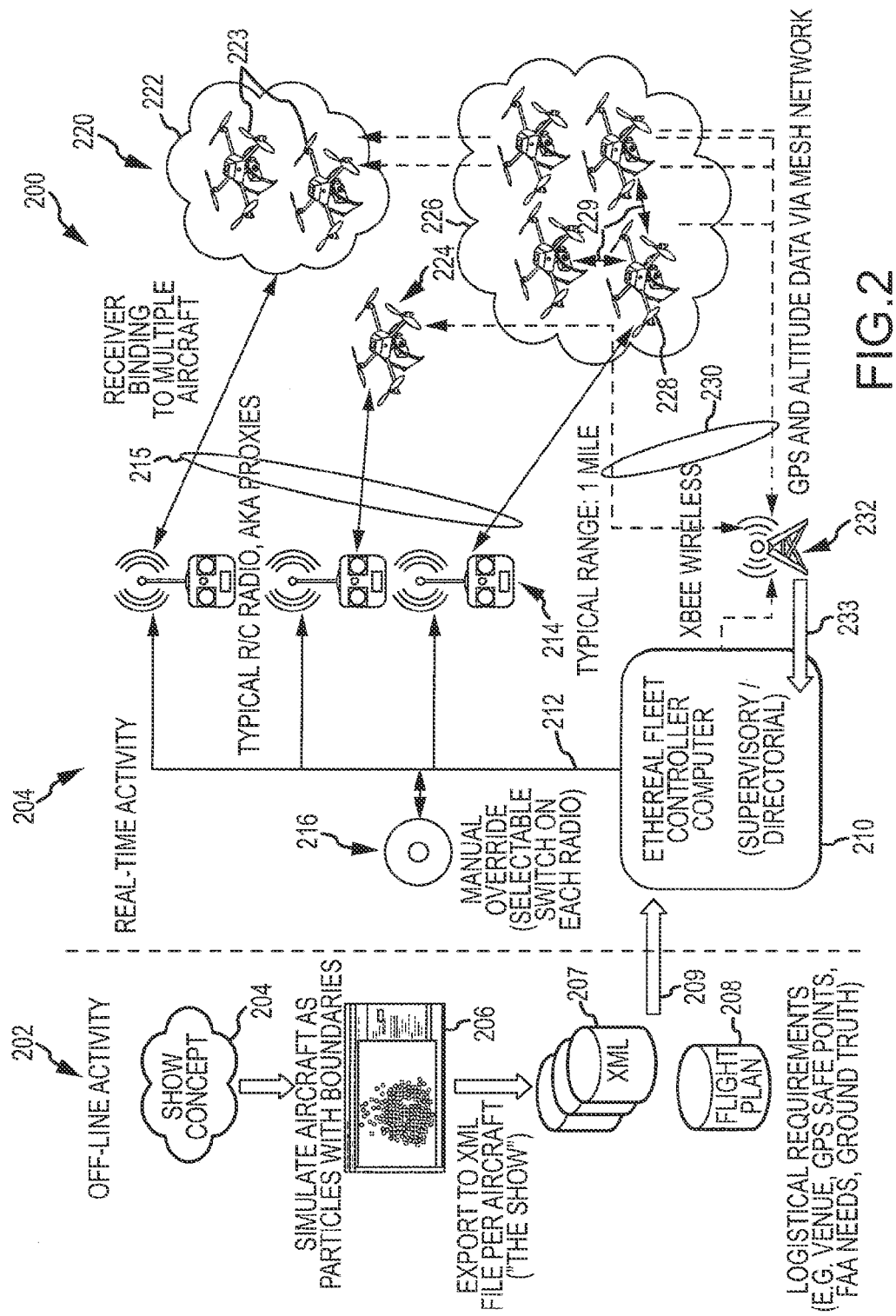
FIG. 2 is a functional schematic or block diagram of a system for use in providing flight management or flight control over two or more flying objects such as UAVs.

FIG. 2 illustrates a system (or a flight management control system) 200 for use in managing or controlling UAVs to provide an aerial vehicle flock with synchronized flight. The system 200 is shown to be made up of or include components used to perform off-line activity at 202 and used to perform on-line activity at 204. The off-line activity 202 may include designing or selecting a show concept or choreographed movement 204 for a plurality of UAVs to achieve a particular effect or perform a task(s).

The show concept (e.g., digital data stored in memory or the like) 204 may then be processed with a computer or other device to simulate as particles with spatial boundaries as shown at 206. For example, each multicopter to be used to provide an aerial display or show (or to perform an aerial task) may be modeled as a particle, and a three dimensional space such as a sphere with a predefined diameter may be used to define a safety envelope for that UAV or flying object. The safety envelope or space is used to reduce the risk of a collision between to UAVs (e.g., create and choreograph a show to avoid collisions and not allow two UAVs to have their safety envelopes intersect/overlap as the UAVs move along their flight paths).

The created show or task for the multiple UAVs is then exported to memory or other devices as shown at 207 for processing, with this "show" typically including a file per each UAV or unmanned flying object. Each of these files is processed to generate real world coordinates for each UAV to be achieved over time during a show (or performance of a choreographed task(s)). This processing creates individual flight plans 208 for each UAV, and such processing or generating of the flight plans 208 may include processing the modeled show 207 based on specific logistical requirements. These requirements for example may modify a show to suit a particular venue (e.g., is the air space the same size and shape as in the simulation and, if not, modification may be useful to change or set real world coordinates for one or more of the UAVs).

The logistical requirements may also include setting a ground truth for the venue and adding safe or "home" points (e.g., with GPS or other location settings) where each vehicle can be safely positioned such as at the beginning and end of a show or when a safety override is imparted (e.g., "return to home"). The stage/show management component 202 may be considered a component that translates central show controller commands, which may be a foreign system, to fleet actions that are sent 209 to the fleet management component either through scripts (e.g., data files), real time computer messages, and/or hardware triggers.

Figure 3:
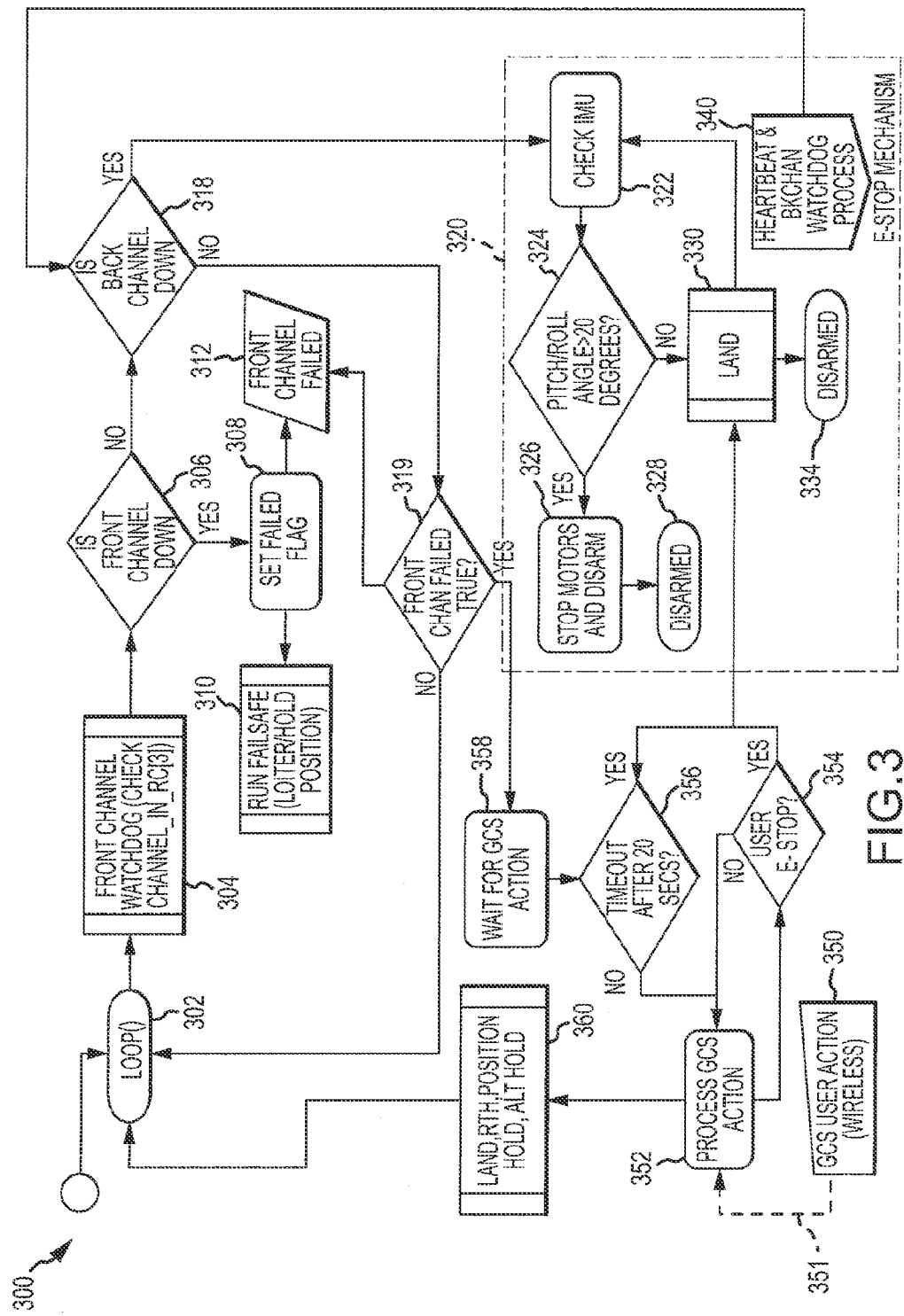
FIG. 3 provides a logic diagram for the onboard logic running or provided for execution on each UAV such as part of a multicopter control panel/board.

At 209, the flight plans are provided to the ground station 210 (or ethereal fleet controller/computer or ground control system (GCS) as used in FIG. 3). The system 200 further includes a number of UAVs 220 shown in the form of multicopters in this example. The multicopters 220 may be in groups/sets with set 222 shown to include two copters 223, set 224 including one copter, and set 226 includes four copters. These sets may act or function together, at least for a portion of a show or flight path, to perform a particular display or task.

In other cases, all of the multicopters may be considered part of large set that moves as a flock or otherwise has its movements time synchronized and/or choreographed by flight plans 208. As shown at 229, a multicopter 228 in the group 220 can communicate with its nearby or neighboring multicopters so as to determine their presence, to determine their proximity, and when needed, to process the flight plan, determined neighbor position, and other environmental data to modify their flight plan to avoid collision and/or communicate 229 with the neighboring multicopter to instruct it to move or otherwise change its flight plan/movement to avoid collision.

As discussed with reference to FIG. 1, the system 200 also includes two communication channels between the GCS 210 and each of the multicopters 220. The front end channel is shown at 212 with the GCS using remote control radios or wireless transceivers 214 to communicate data/control signals 215 to each of the multicopters 220. In this manner, the GCS or receiver 210 binds to multiple aircraft so as to allow multicasting of control signals such as to wirelessly flight plans 208 to each of the multicopters 220 before flight operations are initiated by the GCS 210.

In some cases, a manual override (selectable switch, for example, on each radio 214) 216 is provided to allow an operator to signal 215 a particular multicopter 220 to switch to safe mode (e.g., to return to home, to safely drop to ground, and so on). The back end channel for communications is shown at 230 with each of the multicopters 220, which may have two or more radios as discussed with reference to FIG. 1, communicating telemetry or other data (e.g., GPS and altitude data via a mesh network) to the GCS 210 as shown to be relayed 233 via a wireless transceiver device 232 (e.g., with a range when working with UAV radios of about 1 mile). Each multicopter 220 may include a unique identifier or ID with their telemetry data (e.g., the same ID as used to associate a flight plan 208 with a particular multicopter 220).

In system 200, each of the flying objects 220 may be a multicopter that optionally may be modified to carry a variety of payloads (or units). For example, the payload may be one or more lights sources. The payload may include the communication devices, e.g., two or more radios discussed herein, to provide multiple communication channels. Any communication channel may be linked to the GCS 210 (or its fleet management module discussed above with reference to FIG. 1). In one implementation, the multicopters 220 were each modified via software (e.g., local control module 160 in FIG. 1) to provide all the logic (e.g., see FIG. 3 and corresponding discussion) required for operation in a show environment including flocking logic, safety strategies, light show scripts, character expression logic, and alternative show maneuvers.

FIG. 3 illustrates a flowchart or logic diagram of a safety control method or logic 300 that may be implemented on board each multicopter or flying object (e.g., via the local control module 160 as shown for a multicopter 150 in FIG. 1). In the safety process 300, a process loop begins at 302 and a first step may be to perform a check of the front end communication channel at 304. At 306, the process 300 continues with determining whether the front channel is still up/available or is now down. If determined at 306 to be down, a flag is set at 308 indicating the front end communication channel has failed as shown at 312.

At this point, the process 300 may continue at 310 with controlling the multicopter in a failsafe mode as shown at 310, and this may involve having the multicopter loiter or hold its present position for a preset period of time, until the front end channel is available (as determined by repeating step 304), or until instructed otherwise by GCS user action 350 (e.g., an operator may identify a loitering multicopter in the group/flock and instruct it to take certain action such as to return to home (RTH)).

The process 300 may include an emergency stop cycle or subroutine 320. In the stop cycle 320, an ongoing (frequent periodicity) step 340 a heartbeat of the multicopter may be performed. In this step 340, the logic/processor onboard may transmit an "alive" pulse/signal to the GCS and also determine its present position and other telemetry, which is also transmitted to the GCS via the back end communication channel. As part of step 340, a check is performed to determine a status of the back end channel to the GCS. The following are examples of multiple modes of failure that may result in different reactions: (a) show failure (e.g., missed waypoint) to which the system may respond by adapting to stay safe and continue flight; (b) front channel communication failure to which the system may respond by going to autonomous mode to stay safe and possibly cancel a show if needed; (c) back channel communication failure to which the system may response by waiting for confirmation and hold in place until communication is reestablished (if not, then land); and (d) full communication failure to which the system may respond by landing in place.

After step 340 is performed, the method 300 continues at 318 with a determination of whether or not the back channel is down. If not, the method 300 can continue at 319 with a determination of whether or not the front channel flag 312 is set. If not, the method 300 can return to perform another loop 302. If the front end flag is set at 312 (fail is true) as determined at 319, the method 300 may continue at 358 with waiting for a control signal or action to be performed by the GCS (e.g., an operator uses the GCS to transmit a control signal). At 356, a determination is made regarding a timeout after a preset period of time.

If the timeout period has not elapsed, the method 300 continues at 352 with processing of a GCS action that is provided by wireless signal/transmission 351 from the GCS 350. A user or operator may provide input at a ground station or GCS to perform a user-initiated emergency stop, which is checked for at 354. If an e-stop is not issued in the transmission 351 as determined at 354, the method 300 may continue at 352 with further processing of the action 350 such as to determine that instructions have been received to operate the multicopter in a particular manner.

These responses/actions are shown at 360 with the local/onboard control logic acting to land the multicopter, to return the multicopter to home, to hold the present position (but changing altitude is allowed), to hold altitude (but wind or other environmental conditions may cause position to change over time), or other action. This step 360 is followed with a new control/safety loop 302. In this manner, a user can provide at 350 override or direct control signals to each multicopter that can override a program/flight plan at any time or in response to loss of the front end communication channel. When a timeout period has elapsed at 356, the e-stop cycle 320 may be performed. In particular, the onboard logic may act to land the multicopter as shown at 330 if no GCS action is received within the present time (e.g., 10 to 30 seconds or the like).

The e-stop cycle 320 may also be initiated when it is determined by the onboard control logic at 318 that the back end channel is down. In such a case, step 322 is performed to check the IMU and then determine at 324 whether the pitch or roll angle is greater than some preset acceptable limit (e.g., 15 to 30 degrees or more). If this pitch is not exceeded, the e-stop cycle 320 continues at 330 with landing the multicopter. If the pitch or roll angle is greater than the preset maximum at 324, the e-stop cycle 320 continues at 326 with stopping the motors and otherwise "disarming" the multicopter to place it in a disarmed state at 328 (at which point the multicopter will fall to the ground rather than gently landing as is the case at 330).

With the above discussion and general discussion of a flight control system (system 100 and 200) understood, it may be useful to more specifically discuss functions of particular components of such a flight control system and the onboard logic and controls of each multicopter or other with regard to the ground control system (GCS), the GCS controls preflight, show state, and safety.

During preflight, an operator uses the GCS to load a flight plan onto each UAV (e.g., transmitted wirelessly via the front end channel for storage in memory accessible by the local control module of the UAV). During a show, the GCS and its fleet manager module acts to run the flight plan previously loaded on the UAV. This "running" may involve an operator using a trigger module or mechanism of the fleet manager module to say start or "go" to initiate all the multicopters or UAVs to begin to run a flight plan. Typically, before this step, each UAV is placed at a ground location for takeoff or at an aerial home position, with these home or start positions being included in the overall flight plan for a show or to perform a task as a flock of UAVs.

During the show, the GCS actively monitors safety and an operator can initiate a GCS user action as shown in FIG. 3. More typically, though, the GCS monitors the operation of all the UAVs in the flock by processing the heartbeat and telemetry data provided by each of the UAVs via the back channel communications from the back end radio or, transceiver provided on each UAV. In some embodiments, the fleet manager module has software/logic that compares the actual state of each UAV against the expected state at that particular time for the UAV according to the presently enacted flight plan.

If the actual state does not compare favorably (e.g., the position of the UAV is outside an acceptable range such as several-to-many feet off course), the fleet manager module may generate an alert (audio and/or visible) on a GCS monitor or other linked device to warn an operator of this possibly unsafe condition. At this point, the warned operator may take action (user action in FIG. 3) to correct the operations of the UAV(s) or to instruct the UAV to return to home or take other actions.

For example, the fleet manager module may allow the operator to select or "hit" a safety button (or selectable icon), and the fleet manager module would communicate via the front end or back end communication channel to instruct the UAV to go into a predefined safety mode of operation (e.g., see box 360 of FIG. 3). This safety mode instruction or GCS is processed by the local control module on the UAV, with the UAV drive system correspondingly operated to position the UAV in a safe location or mode of operation. Such a safety mode/operation can be issued on a per UAV basis or to the entire flock concurrently (or even to a subset of such a flock). In some embodiments, the fleet manager module actively negotiates with each UAVs local control module (or its subroutine handling sate operations); in other words, hitting the "safety button" on the GCS does not necessarily require the affected UAV to immediately take action as the UAV control system may act to complete a task or first attempt a control adjustment to correct its operations prior to allowing GCS override (such as causing the UAV to return-to-home).

After the "go" or start signal is issued by the fleet manager module/GCS upon an operator input, the GCS along with the local control software/hardware on each UAV work to safely perform the preloaded flight plan/show. As discussed above, the control method and system taught herein combines centralized control (e.g., to allow manual override for safety or other reasons during a show/flight-based task) with smart UAVs to more effectively provide flock-type movement of the UAVs. In other words, the UAVs may each be given a particular flight plan that they work toward over time (during a show time period) while attempting to respond to environmental conditions such as changing wind or the unexpected presence of another UAV within or near to their safety window (or safe operating envelope surrounding each UAV such as a sphere of several-to-many feet such as 10 to 30 feet or the like in which no other UAV typically will travel to avoid collisions).

During operations, the GCS is used to trigger each of the UAVs to begin their stored flight plan starting from a home or show/task start point (e.g., each UAV may be placed at differing launch points or be hovering/flying at a particular ground point at a predefined start altitude). In some cases after the "go" is received by a UAV, each UAV uses its local control module (or other software/programming) to attempt to follow the flight plan but with no time constraints. In other words, the flight plan may define a series of earth points or way points along with elevation/altitude values for the UAV. In these embodiments, the UAV is controlled in a relatively fluid manner and not tied to accomplishing tasks in a certain amount of time (e.g., the flight plan does not require the UAV be at a particular location at a particular time after the go signal is received).

In some implementations such as those using multicopters for the UAVs, the flight plan is built up assuming that each UAV travels at a preset and constant flight speed. This flight speed may be set independently for each UAV or may be the same (or within a relatively small range) for each of the UAVs. In other cases, though, the local control module may be adapted to adjust the flight speed to suit the environmental conditions.

For example, stronger winds may make it beneficial to speed up (or at least operate rotors of a multicopter) when moving against a strong head wind and to slow down when moving with the strong tail wind. The speed of the wind may be determined at the UAV with the local control module and sensors provided as part of the payload or the wind direction and speed information may be provided by the GCS to each of the UAV. In some case, flock control is preferred such that each UAV has its speeds adjusted commonly, e.g., each UAV runs at like flight speeds while moving in a like direction so as to appear to have synchronized and non-random movement.

In some embodiments, each UAV acts independently to try to continue to follow its own flight plan. Each flight plan differs at least in the fact that each UAV begins at a differing start point or home and moves toward its first way point. To this end, each UAV is equipped as needed to determine its present three dimensional position that includes a latitude/longitude position (e.g., a GPS position or similar position data) along with its present altitude or height above the ground. The local control module uses this present position data to determine modify (if necessary) its present direction or heading to continue to move toward the next way point in its flight plan. This may involve changing it course and also its angle of attack to reach the desired height at the way point.

Generally, the GCS monitors for safe operations of the UAVs as discussed with reference to FIG. 3, but an operator may take steps to manually override a particular one of the many UAVs to provide better control of that UAV. For example, the fleet control module of the GCS may operate to compare an expected position of the UAV with its actual position (provided via back end channel in its telemetry or other data). A warning may be provided in a GUI that the UAV is trending of course or is outside an accepted tolerance for reaching its next way point.

For example, the GUI may show properly operating and positioned UAVs in green, UAVs that are off course or out of position a safe amount in yellow, and UAVs outside of a safe envelope in red. The red/unsafe UAVs may be handled automatically or manually to cause them to enter a safe mode of operation (return to home, for example). The yellow UAVs that are operating outside of desired conditions, though, may be manually operated to try to assist them in returning to their flight path such as by manually changing speed, direction, angle of attack, or the like to more quickly bring the UAV to a desired way point. After manual operations are complete, the control may be returned from the GCS to the local control module for local control of the UAV based on the flight plan stored in its memory. Note, the GCS may be configured to evaluate collision issues and execute collision avoidance commands to preserve show quality (i.e., flight performance) in degrading weather conditions.

In other embodiments, a local control module of a UAV may operate to adjust the flight plan during flight to better react to environmental conditions (such as gusts of wind that may throw it, at least temporarily, off course). For example, a flight plan may provide a time relative to a start time (when "go" was signaled by the GCS to the UAVs) to reach each of its way points on the flight plan. One embodiment may call for the UAV to determine a distance to a next UAV and its present estimated time of arrival (e.g., using changes in its earth position to determine its true speed or rate of travel). If the time of arrival is not within a window about a preset/goal arrival time, the local control module may act to increase the flight speed of the UAV such as by increasing the rate of rotation for the rotors of a multicopter. Likewise, if the UAV is moving too quickly (e.g., strong tail wind), the UAV's local control module may act to slow the flight speed. In this manner, the movement of the UAVs may remain better synchronized to provide a flock control.

In other cases, though, the local control module of the multicopter or other UAV acts to determine whether or not a way point was reached within a predefined time window, with the flight plan defining times for being at each way point relative to a start/go time. If not (e.g., did not reach a way point at Time "X" plus an allowable delay), the local control module may act to modify the flight plan by directing the UAV to skip the next way point and fly directly to the way point following the next. For example, a flight plan may include way points A to Z. If a local control module determines that a predefined time window, for way point C was not achieve, the local control module may skip or remove way point D from the flight plan and cause the UAV to take a direction/course (e.g., a straight line or other predefined path) to way point E. In this way, the flight speed is maintained (e.g., all UAVs fly at the same speed) while allowing the UAV to "catch up" if they fall behind their flight plan (e.g., defining a set of way points or earth points to pass through or nearby within a predefined time period that may correspond with a time to perform a show/display or perform a task with the multicopters).

With regard to safety and monitoring of operations, each UAV may store a definition of a geofence that defines an outer perimeter (and an inner area in some cases) or boundary of a geographical area. The UAV's local control module compares the present position determined for the UAV during a flight and compares this position to the geofence. If this boundary is crossed (or is being approached such as within a preset distance from the geofence, the local control module may act to promptly return the UAV back within the geofence boundaries. In other cases, the UAV may be switched into a safe operating mode (as discussed with reference to FIG. 3), and this may cause the UAV to return-to-home or otherwise safely return to ground (or other safe holding position). For example, the geofence may define the boundaries of a lagoon or stadium field, and the UAVs may fly over this geographical area (or within, an area offset from the physical boundaries of this area to define a somewhat smaller area) but not outside it so as to avoid flying directly over any people in an audience to provide enhanced viewing safety.

Further, regarding safe UAV operations, some embodiments of flight control method and system involve configuring the UAVs to have UAV-to-UAV (or multicopter-to-multicopter) communications or other technologies provided onboard to avoid collisions without reliance upon the GCS to intervene. Each UAV may use its local control module to operate on an ongoing basis to detect when another UAV comes within a predefined distance from the LAN such as within a sphere of 10 to 30 feet or the like. The first UAV to detect such a condition (or both UAVs if a tie) generates a collision warning message and transmits this message to the offending/nearby UAV to alter its course or present position to move out of the first UAV's air space. For example, the UAV receiving such a collision warning message may store an evasive action in its memory and initiate this action (a fixed movement such as angling to the right or left a preset angle). The evasion may be taken for a preset time period and then the UAV may return to following its flight plan (e.g., recalculate a course to the next way point from its new present location or the like).

As discussed with regard to FIG. 3, the local control module of each UAV may perform other functions to control its own flight to ensure safe operations. For example, the local control module uses a front end radio and a back end radio to communicate with the fleet manager module of the GCS. The status of these communication channels is monitored by the local control module, and, when either communication channel is detected to be lost (e.g., an expected receipt confirmation from the GCS is not received to a transmission of a telemetry data by a UAV), the local control module may react to this loss of communication by entering a safe operating mode (e.g., land, return to home, hold position, or the like).

In another example, the UAV's local control module monitors the present orientation and/or altitude of the UAV and if the orientation is outside an acceptable range (e.g., pitch or roll exceeds 20 degrees or the like for a multicopter) or if the altitude is too high or too low, the local control module may also act to enter the UAV into a safe operating mode (before or after attempting to correct the operating problem).

Figure 4:
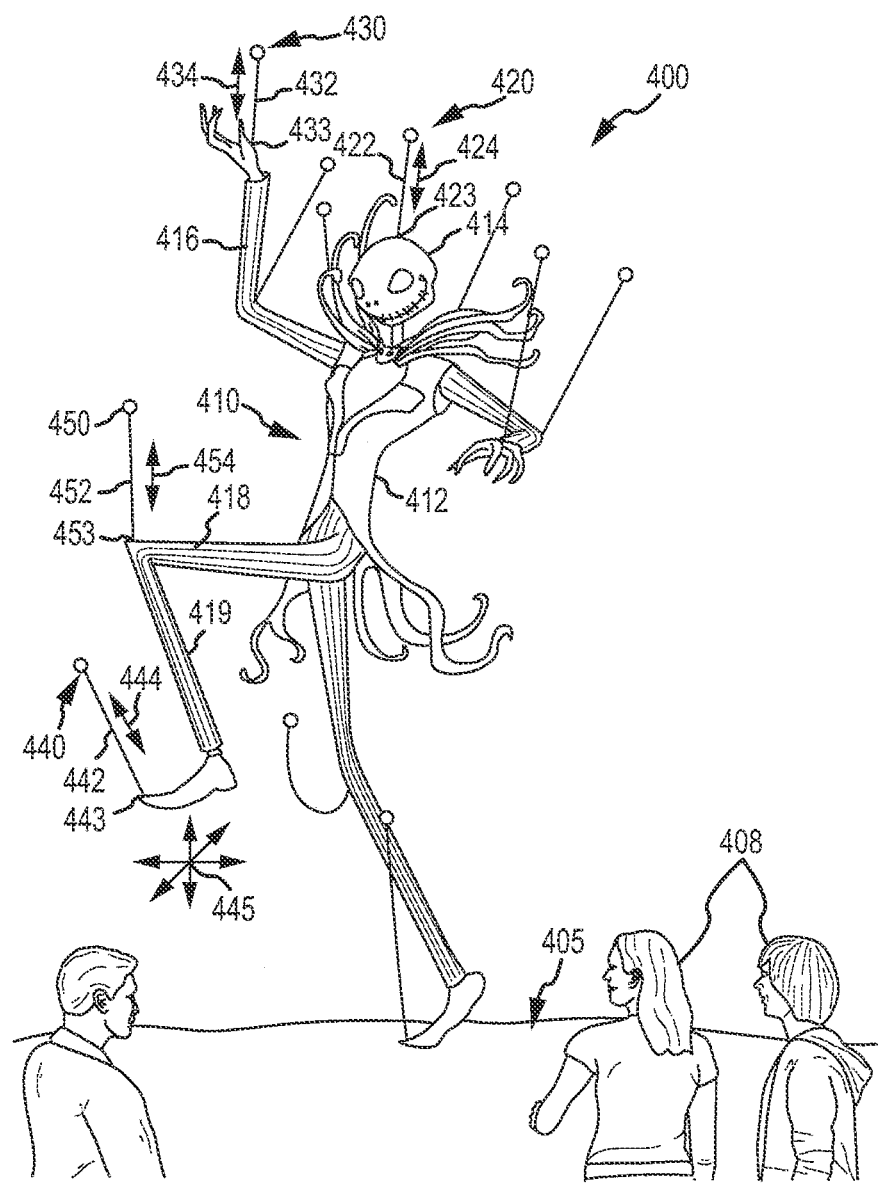
FIG. 4 illustrates an exemplary aerial display system during operation to support and articulate an aerial marionette within a display air space.

With the above understanding of control of UAVs understood, it may be useful to again turn to a discussion of aerial display system used to provide aerial puppetry or a large-scale string puppet (or marionette) show using UAVs. For example, FIG. 4 illustrates an exemplary aerial display system 400 during operation to support and articulate an aerial marionette 410 within a display air space over an audience of spectators 408 standing or located on the ground 405.

The marionette or string puppet 410 includes a body 412 and a number of articulatable (or selectively moved or positioned) appendages or elements such as a head 414, an aim 416, a leg made up of an upper portion 418 and a lower portion 419. These may each be fabricated of lightweight materials and include a frame and may be configured for low wind resistance or, alternatively, be adapted for containing a gas such as helium to lighten each of these portions to reduce the force required to support and move the components of the marionette 410). Also, the connection of the head 414, arm 416, and upper leg portion 418 to the body 412 may be such that each may move, rotate, or pivot relative to the body when articulated by their supporting UAVs. To this end, FIG. 4 illustrates that the aerial display system 400 may include a large number (e.g., 10 to 100 or more) UAVs that would be controlled as discussed above by a GCS not shown in FIG. 4 but shown in FIG. 1) and also through onboard logic as well as UAV-to-UAV communications (as discussed above for safety purposes and as discussed would be understood as being useful for maintaining show quality while using UAVs as puppeteers for the marionette 410).

As shown, a UAV 420 is linked via control or support wire/line 422 at a tether or connection point/element 423 to the marionette head 414. With movement of the UAV 420 based on a show program/flight plan, the control line 422 moves or tensioned in a particular direction and to a certain amount. This causes the head 414 to be positioned in the air space above the ground 405 and to be articulated as desired to cause the marionette 410 to be animated or to mimic a character (e.g., to turn the head 414 to face one portion of the audience 408 and then another portion or to move up and down while talking or singing and so on).

To position and articulate the arm 416, the UAV 430 is shown to tension and move 434 connecting line 432, which is attached at an end to the tether or connection point/element 433 to the arm 416. As the UAV 430 follows its assigned flight plan to a number of way points in the display air space, the arm (or forearm) 416 is positioned and articulated as it is supported by the UAV 430 at point/element 433. Similarly, the upper leg 418 is positioned and articulated by the UAV 450 via connecting or supporting line 452 that is attached to the UAV 450 and to the leg 418 at tether or connecting point/element 453. During operation, the UAV 450 moves along its flight plan, which results in the line being moved and tensioned in a certain direction and amount, respectively, as shown with arrow 454. This causes the tether point 453 to move so as to support and articulate the upper leg 418.

Further, another UAVs 440 is used to move and apply tension to (shown with arrow 114) support or connecting line 442. This line 442 is attached to the lower leg portion 419 at tether or connecting point/element 443. Hence, when the line 442 is moved 444, the tether element 443 moves or is articulated (in any direction as shown with arrows 445) so as to move the lower leg 419 (e.g., to cause the marionette to walk, kick, dance, and so on). The movements 424, 434, 444 of the connecting or supporting lines 422, 432, 442 is coordinated and controlled with the concurrent execution of the flight plans by the UAVs 420, 430, 440, 450, which may be thought of as working as a team or flock to provide puppeteering of the marionette 410 (which may be quite large such as 40 to 100 feet or more in height).

In the display system 400, the marionette 410 was supported and articulated tether or connecting points/elements at particular location within or on the exterior of the marionette 410. However, as with conventional string puppets or marionettes, it may be desirable to support and articulate the marionette with UAVs that are attached via a line or wire to an articulation or frame member on or within the body/appendages of the marionette.

Figure 5:
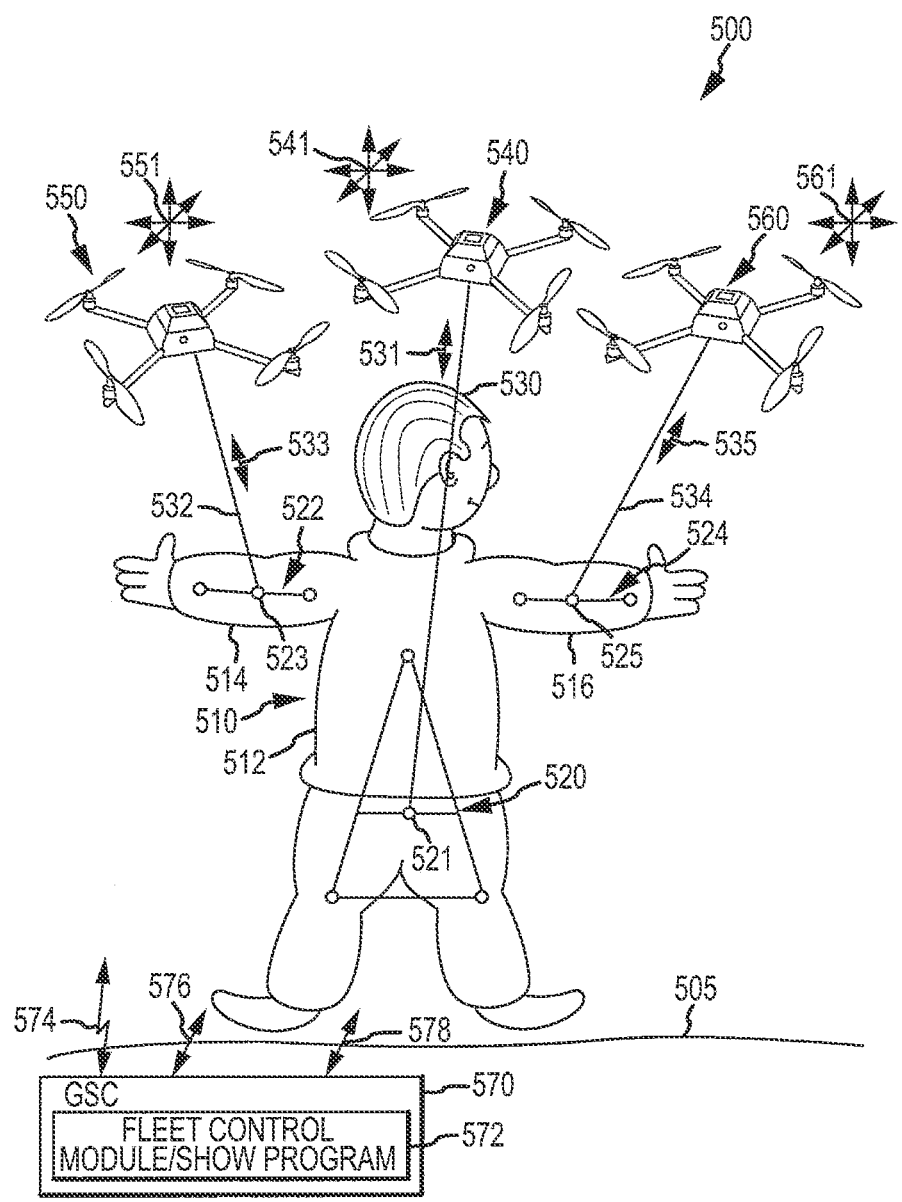
FIG. 5 illustrates another aerial display system showing UAVs manipulating and supporting an aerial marionette via puppet frame elements in the arms and torso of the marionette.

With this in mind, FIG. 5 illustrates an aerial display system 500 with a marionette or string puppet 510 that has a body 512 and articulatable appendages/limbs 514, 516. Within or on these marionette components, one or more articulation frames or members are included to provide UAV attachment and tether points that better support and allow lifelike (or other desired) movement of the marionette 510.

Particularly, the marionette 510 includes a first articulation frame 520 with a tether point/element 521 on or within the back or torso 512 of the marionette 510, a second articulation frame 522 with a tether point/element 523 on or within the left arm 514 of the marionette 510, and a third articulation frame 524 with a tether point/element 525 on or within the right arm 516 of the marionette 510. The body frame 520 is shown to be triangular and planar in shape but other shapes may be used while the frames 522, 524 are both shown to be linear or elongated tubes, rods, or shafts (again, though, the shape of the frame may be altered to practice the system 500). The frames 520, 522, 524 may be formed of rigid or somewhat flexible materials such as metals (e.g., aluminum) or plastics.

With the use of the frames 520, 522, 524, lifting and movement of the frames 520, 522, 524 cause a larger surface or portion of the marionette 510 to be lifted and moved/articulated. This acts to better conceal the tethering or connecting points 521, 523, 525 and/or articulates the marionette 510 in a more lifelike or desired manner. To each of the connecting points 521, 523, 525 is attached a connecting line/wire or tether 530, 532, 534 that may be pulled selectively moved and tensioned (or not tensioned) as shown with arrows 531, 533, 535 so as to support and articulate the marionette 510 in a display air space over the ground 505.

A set or team of UAVs (multicopters, for example) 540, 550, 560 are provided in the display system 500 and attached to the opposite ends of the tethers or lines 530, 532, 534, respectively. When the UAVs 540, 550, 560 move in various directions as shown with arrows 541, 551, 561, the lines 530, 532, 534 move 531, 533, 535, which positions and articulates the marionette 510 by articulating the body 512 via frame 520 and connecting point 521, the arm/limb 514 via frame 522 and connecting point 523, and the arm/limb 515 via frame 524 and connecting point 525.

As discussed above with regard to FIGS. 1-3, a GCS 570 may be provided that executes a fleet control module/show program 572 so as to control movement of the UAVs 540, 550, 560. Particularly, the GCS 570 may wirelessly communicate (as shown with arrows 574, 576, 578) with the UAVs 540, 550, 560 prior to the show to download a flight plan and during a show to, for example, provide safety-based commands or override/correction commands to move the UAVs in the display air space.

As shown, the three UAVs 540, 550, 560 may be executing, via local control and communication with the other UAVs 540, 550, 560, the flight plan assigned to each by the fleet control module 572. This may involve each UAV 540, 550, 560 moving as a flock (choreographed manner) to a number of way points along a flight path associated with each UAV 540, 550, 560. The movements 541, 551, 561 of each UAV 540, 550, 560 causes the tether or connecting lines 530, 532, 534 to move 531, 533, 535, which articulates the marionette such as to mimic movement of a particular character as part of a puppet show.

Figure 6:
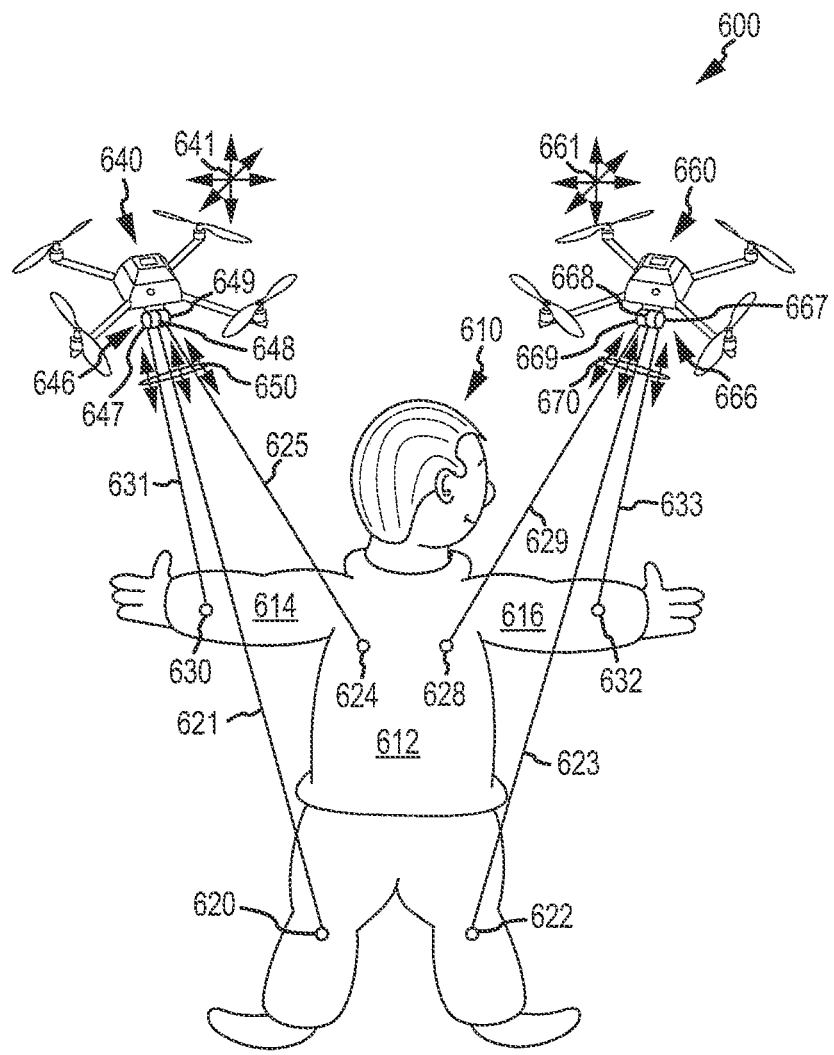
FIG. 6 illustrates yet another aerial display system similar to the system of FIG. 5 but showing use of multiple control/support lines per UAV and a winch assembly for selectively adjusting the relative length of the control lines to articulate the supported marionette by moving the UAVs and also by moving the wires/lines (with or without UAV movement)

FIG. 6 illustrates an aerial display system 600 with a marionette 610 that is supported and articulated via a plurality of tether or connecting points/elements positioned on (or within) its exterior surfaces. As shown, the marionette 610 includes a body/torso 512 with two connecting/tether points or elements 624, 628, arms 614, 616 each with a connecting point/element 630, 632, and legs each with a connecting point/element 620, 622. Each of these connecting elements is attached to a first end of a tether or connecting line 621, 623, 625, 629, 631, 633.

In the system 500, a UAV was provided for each tether or connecting line. In system 600, however, each UAV is used to support and articulate the marionette 610 at two or more connecting elements/points. Particularly, in the illustrated example of FIG. 6, a first UAV (e.g., multicopter) 640 and a second UAV 660 are provided that may be selectively positioned as shown by arrows 641, 661 (e.g., to follow a flight plan defining their concurrent movement to a number of show way points and/or based on control from a GCS, not shown in FIG. 6). Each UAV 640, 660 is connected to two or more of the tethers with UAV 640 connected to tethers 621, 625, and 631 and UAV 660 connected to tethers 623, 629, 633. The use of a single UAV to support and move two or more connecting points/elements of the marionette 610 results in a different articulation of the marionette than use of one-to-one relationships between connecting points and UAVs.

Further, the connections at the UAVs 640, 660 with the lines may be fixed so as to provide a single length of the tethers or connecting lines (e.g., line 621 is always 50 feet in length as measured between the connecting point 620 and the UAV 640). However, it may be useful for each UAV 640, 660 to be able to further articulate the marionette 610 by flying to differing positions as shown by arrows 641, 661 but also concurrently (or when at a hover location in the flight plan) acting to change the length or selectively articulate one or more of the tethers or connecting lines.

For example, the UAVs 640, 660 are shown to include winch assemblies 646 and 666 to reel in and reel out the connecting lines in a concurrent or independent manner to articulate the marionette while hovering or while flying to a new location. Particularly, the winch assembly 646 includes winches/reels 647, 648, 649 attached to lines 631, 621, 625, respectively, and operable concurrently or independently by the UAVs local controls or via a GCS to reel in or out 650 the lines (e.g., shorten (increase tension) or lengthen (decrease tension). Similarly, the winch assembly 666 includes winches/reels 667, 668, 669 attached to lines 623, 629, 633, respectively, and operable to concurrently or independently (by the local UAV controller or the fleet management module of the GCS) to reel in or out 670 the lines (shorten or lengthen the lines or increase or reduce tension in the lines). As will be appreciated, the display system 600 provides effective articulation of the marionette as the UAVs 640, 660 can also be used to move and support the marionette 610 within an aerial display space above a group of spectators.

The inventors recognized that since the UAVs were being controlled in a flocked manner to support two or more marionettes that the marionettes along with their supporting UAVs can be used to create a marionette assembly or super marionette or flying structure made up of a number of structure components or portions. One may be reminded of childhood toys in which building blocks or other pieces can be combined and put together in numerous ways to create a different finished product or toy. The same can be achieved with flying or hovering aerial marionettes supported and articulated by a flock of UAVs.

For example, in a show spectacular or aerial display environment, there is a desire to extend 3D aerial displays, such as "floats", to multiple structures that self-assemble into a superstructure. The final assembly or product may be floating in the air or have lower portions contacting or even partially supported by the ground or terrestrial supports. The use of flying UAVs or robots (such as multicopters) that can be controlled by both ground station logic and onboard autonomous logic is used in an aerial display system to create a flying structure or marionette assembly.

The superstructure or marionette assembly may be assembled and disassembled as part of the aerial display show by choosing the marionettes (UAV payloads) as well as defining the flight plan with way points that cause the payloads to "assemble" or at least hover in spaces/locations that appear to form a superstructure to the spectators (new 3D display or visual effect by combining the marionettes/UAV payloads). In other words, each marionette or payload of each UAV of the display system may be thought of as a component or portion of a larger assembly or superstructure when the UAVs move to "assembled" positions or way points of their respective flight plans.

Figure 7:
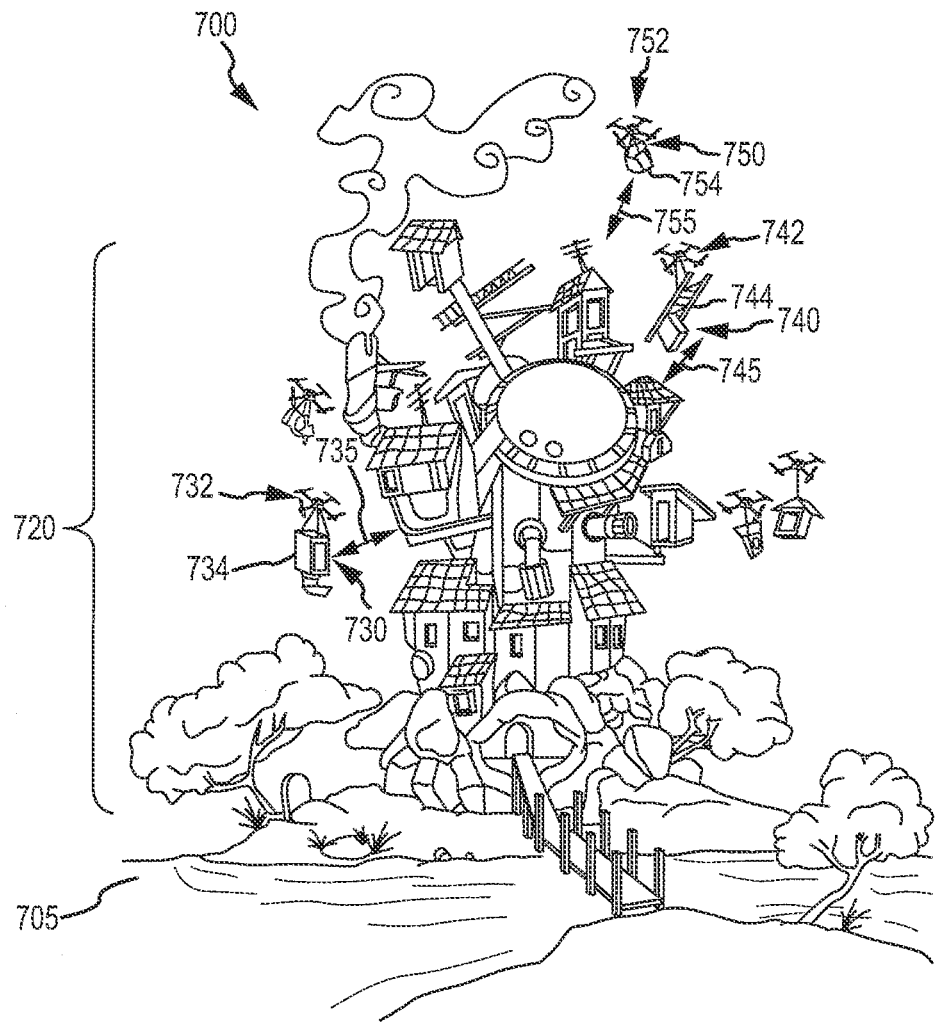
FIG. 7 illustrates an embodiment of an aerial display system in which each "marionette" is supported and articulated by one or more UAVs is configured to be combined with a one-to-many other "marionettes" to form a larger marionette/display assembly, which can then be further moved about the display air space and/or articulated by the UAVs.

FIG. 7 illustrates one example of an aerial display system 700 being configured and operated to provide a display or show involving the assembly (or disassembly) of a superstructure or marionette assembly 720 over a viewing area or the ground 705. As shown, a number of marionettes/structure payloads supported by one or more UAVs (e.g., multicopters) have been combined on or over the ground 705 to form an aerial superstructure 720.

Further, as the UAVs perform their flight plans, the superstructure 720 is expanded or completed with the addition of more structure payloads/marionettes. Particularly, a first, second and third marionette assemblies/structure components 730, 740, 750 are shown to be hovering nearby the assembly/superstructure 720. The marionette assemblies 730, 740, 750 include a structure payload or marionette 734, 744, 754 each supported by one or more UAVs 732, 742, 752.

These UAVs 732, 742, 752 are operated to follow a flight plan (or control by the GCS, not shown) to move the payloads 734, 744, 754 as shown with arrows 735, 745, 755 toward (or away from) the others payloads/marionettes of the superstructure/assembly 720 to further assemble (or disassemble) the superstructure/assembly 720. Each marionette/payload is designed to match nearby payloads and even, in some cases, to "engage" the nearby components to provide an appearance of being assembled to or joined to the neighboring payloads/marionettes to form the superstructure. The fabricated/assembled superstructure 720 may simply hover in place or its parts may be articulated by movement of the UAVs while remaining "assembled". In other cases, the entire assembly/superstructure 720 may move over the ground 705 to new locations.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The aerial display systems described provide a number of useful advantages over prior display techniques and devices. For example, large characters can be flown safely to make a dramatic display. The characters or marionettes can be articulated much more freely and effectively than, for example, a dirigible. The marionette's body may be formed of very light materials yet can be made to appear to be relatively hard or firm (e.g., hard-appearing edges and features) while remaining soft and flexible, which improves safety for an audience of spectators below the flying marionette. The use of a lightweight marionette allows a team or number of relatively small UAVs to provide the relatively small suspension force required to keep the marionette afloat with or without articulation. The marionettes described are not tethered to the ground or are not ground based but, instead, are supported by flying vehicles that provides a unique and dynamic aerial show.

We claim:

1. A system for providing an aerial display, comprising: a plurality of unmanned aerial vehicles (UAVs); and a ground control system with a processor executing a fleet manager module and with memory storing a different flight plan for each of the UAVs; and a marionette with a body and articulatable appendages attached to the body, wherein the body and appendages are supported with tether lines extending between the marionette and the UAVs, wherein, during a show time period, the UAVs concurrently execute the flight plans to position and articulate the marionette within a display air space.

2. The system of claim 1, wherein the UAVs each comprises a multicopter.

3. The system of claim 2, wherein each of the multicopters comprises a local controller operating to move the multicopter through a series of way points defined by the flight plan associated with the multicopter.

4. The system of claim 1, wherein, the marionette comprises a plurality of connecting elements each attached to an end of one of the tether lines.

5. The system of claim 4, wherein each of the UAVs is attached via one of the tether lines to only one of the connecting elements.

6. The system of claim 4, wherein each of the UAVs is attached via the tether lines to two or more of the connecting elements.

7. The system of claim 6, wherein each of the UAVs includes a winch assembly for selectively adjusting a length of each of the tether lines to articulate the marionette during the display time period.

8. The system of claim 4, wherein at least some of the connecting elements is coupled to an articulating frame on or within the body or the appendages of the marionette.

9. The system of claim 1, further including a second marionette supported by one or more of the UAVs, wherein the flight plans define flight paths causing the marionettes to be positioned in proximity in the display air space to form a floating superstructure.

10. A flight control method, comprising: at a plurality of multicopters, receiving a flight plan unique to each of the multicopters from a ground station; concurrently operating each of the multicopters to execute the flight plans within an air space under control of a local control module executed by a processor; and during the operating of the multicopters, supporting a string puppet with a body and articulatable appendages attached to the body with the multicopters, whereby the string puppet is supported and articulated in the air space by movement of the multicopters.

11. The method of claim 10, further including:
providing a communications channel between pairs of the multicopters;
with a first one of the multicopters detecting a second one of the multicopters in a predefined space proximal to the first one of the multicopters; and
operating the display payload of the first one of the multicopters in a new manner based on an identity of the second one of the multicopters.

12. The method of claim 10, wherein the string puppet comprises a plurality of connecting elements each attached to an end of a tether line extending to one of the multicopters.

13. The method of claim 12, wherein each of the multicopters is attached via the tether lines to two or more of the connecting elements and wherein the method includes selectively adjusting a length of each of the tether lines to articulate the string puppet during the operating of the multicopters step.

14. The method of claim 10, further comprising supporting a second string puppet with the multicopters and wherein the operating of the multicopters includes moving the string puppets into adjacent positions to form a floating superstructure movable and articulatable in the air space.

15. An apparatus for use in an aerial display, comprising: a marionette with a body and articulatable appendages attached to the body with a plurality of connecting elements; a plurality of UAVs; and tethering lines extending between the UAVs and the connecting elements, wherein the UAVs have synchronized movement during a show time period through a display air space to support and articulate the marionette to move between at least a first position and a second position.

16. The apparatus of claim 15, wherein the UAVs each include local controllers executing flight plans to move each of the UAVs along a predefined flight path to provide the articulation and positioning of the marionette.

17. The apparatus of claim 15, wherein the connecting elements are provided on joints or frames of the marionette.

18. The apparatus of claim 15, wherein each of the UAVs is attached to at least two of the tethering lines.

19. The apparatus of claim 18, wherein the UAVs include a mechanism for selectively and independently articulating the at least two of the tethering lines.

20. The apparatus of claim 15, wherein the marionette comprises a plurality of subcomponents each including one or more of the connecting elements and wherein the subcomponents may be assembled and disassembled in the display air space by movement of the UAVs along predefined flight paths.

* * * * *